United States Patent [19]
Moore

[11] Patent Number: 5,772,514
[45] Date of Patent: *Jun. 30, 1998

[54] TORQUE CONTROL DEVICE FOR ROTARY MINE DRILLING MACHINE

[75] Inventor: Richard E. Moore, Humble, Tex.

[73] Assignee: Duramax, Inc., Middlefield, Ohio

[ * ] Notice: The term of this patent shall not extend beyond the expiration date of Pat. No. 5,588,916.

[21] Appl. No.: 713,781

[22] Filed: Sep. 13, 1996

Related U.S. Application Data

[63] Continuation of Ser. No. 197,726, Feb. 17, 1994, Pat. No. 5,588,916.

[51] Int. Cl.$^6$ .................................................. E21B 17/06
[52] U.S. Cl. ............................... 464/20; 464/92; 464/160
[58] Field of Search .................................. 464/18, 20, 21, 464/87, 89, 92, 93, 95, 96, 160; 175/299, 321, 322, 195, 325.1; 267/137, 141.2, 125, 153; 403/299, 337

*Primary Examiner*—Daniel P. Stodola
*Assistant Examiner*—William A. Rivera
*Attorney, Agent, or Firm*—D. Peter Hochberg; Mark Kusner

[57] ABSTRACT

A device reducing the deleterious torque in a shock absorbing, rotary drive coupling unit used with a rotary mine drilling machine comprising: a drive plate connectable to a drive shaft of the rotary drilling machine, a driven plate connectable to a driven shaft which has a drill bit, a center portion for coupling the drive plate to the driven plate wherein the center portion includes a deformable shock, vibration and torque-absorbing member, and torque-relief means comprised of a first engagement member(s) connectable to the drive plate and a second engagement member(s) connectable to the driven plate. When the drill bit snags or jams during the operation of the rotary drilling machine, the torque-absorbing member deforms and absorbs some of the torque generated therefrom. When the torque generated from a snag or jam reaches a predetermined level, the engagement members of the drive plate physically contact the engagement member(s) of the driven plate causing the drive plate to directly drive the driven plate thus preventing any additional torque from being applied to the torque-absorbing member. An optional tensile-force relief member is provided which is mounted to the driven plate and is positioned above the drive plate. The drive plate physically contacts the tensile-force relief member in response to a predetermined amount of lifting force applied to the drive plate thereby limiting the distance the torque-absorbing member stretches when the torque control device is lifted from a blast hole.

14 Claims, 12 Drawing Sheets

TORQUE CONTROL DEVICE FOR ROTARY MINE DRILLING MACHINE

This is a continuation of application Ser. No. 08/197,726 filed on Feb. 17, 1994, now U.S. Pat. No. 5,588,916.

BACKGROUND OF THE INVENTION

1. Field of the Invention

The present invention relates generally to a torque control device for a vibration dampening and shock absorbing apparatus for a blast hole drilling machine, and more specifically, to a torque control device for absorbing axial and torsional forces during the operation of a rotary drilling machine.

2. Background of the Invention

In various types of drilling operations, the drill bit is forced downward under pressure while being rotated in order to penetrate earthen formations. These drilling operations can require the application of relatively high downward force to the drill bit as well as relatively high torque to turn the drill bit.

One example is the typical rotary blast hole drill which comprises a large drilling rig to which is attached a rotary drive mechanism. Typically, the drill's rotary drive is capable of being raised and lowered along a substantially vertical axis directly above the formation to be drilled. Additionally, a length of drill pipe or drill string is connected to the rotary drive so as to extend downwardly therefrom in a substantially vertical direction. A drill bit is secured to the downward end of the drill pipe. The drill machine's rotary drive head is activated to rotate both the drill pipe and the drill bit at the desired speed. Then, the rotary drive, together with the drill pipe and bit, is lowered so that the drill bit contacts the surface of the formation to be drilled. Downward pressure is then continuously applied to the rotating drill pipe and bit to force the drill bit to cut downwardly into the formation. As the drilling operation occurs, air is forced through the interior of the drive head, drill pipe, and through the drill bit, thereby forcing cuttings out of the hole and maintaining a clear surface upon which the drill bit may operate.

When the drilled hole is deep enough to accommodate the first length of drill pipe, the drill's rotary drive is disconnected from the drill pipe and raised to its original position. A second length of drill pipe is then connected between the rotary drive and the first length of drill pipe. The rotary drive is then activated and drilling operations are continued. This procedure is repeated until a desired hole depth is achieved.

In order to eliminate the problems associated with vibration and shock to the drilling apparatus, various devices have been employed to dampen vibrations and absorb torsional forces during the operation of the rotary drill. These devices typically comprise a force absorbing apparatus which is connected between the drill machine's rotary drive head and the drill pipe. In some instances, the force absorbing device includes some type of resilient material which absorbs the vibrations and shocks, thereby dissipating the undesirable energy associated with the drilling operation.

U.S. Pat. Nos. 3,746,330 and 3,947,009 show a resilient coupling provided between a drive shaft and a driven shaft of a tubular drill string in a rotary drilling machine. A group of resilient discs are sandwiched between a series of axially-spaced drive, driven and pressure plates which surround drive and driven shaft members. Pin projections extend from the driven plate into the resilient discs while fastening means extend between the drive and pressure plates for compressing the resilient discs together and into union with the pin projections and fastening means.

U.S. Pat. No. 4,109,488 shows a shock absorbing rotary drive coupling for a rotary blast hole drill. The device includes two parallel, horizontal plates. One of the plates, the drive plate, is connected to the rotary drive and the other, the driven plate, is connected to the driven shaft, or drill pipe. The apparatus further includes a resilient member which is bonded between the two plates. The entire apparatus has a hole through its center in order to accommodate the air and fluid which is forced through the drill pipe to the drill bit. Additionally, it has been known in the art to fasten nylon straps to the respective plates. The resilient pad twists and the straps tighten when a predetermined amount of torque is applied to the driven plate. The torque generated by the drive plate is then transferred directly to the driven plate by nylon straps, causing the drive plate to directly drive the driven plate and relieve the torque on the resilient pad. A problem with the nylon straps is that they frequently tear or stretch and, therefore, do not always adequately protect the resilient pad. In addition, the nylon strap can be torn or stretched in a lifting situation, which limits their longevity.

SUMMARY OF THE INVENTION

In accordance with the present invention there is provided a torque control device for managing the forces or torque on the drive shaft and components of a rotary drilling machine used in mining. The device includes a drive plate connectable to the drive shaft of the rotary drilling machine, a driven plate connectable to the driven shaft, or drill pipe, of the rotary drilling machine wherein a drill bit is connected to the end of the driven shaft, a shock, vibration and torque-absorbing center member including an annular body of elastomeric material which couples the drive plate to the driven plate and a cylindrical housing having upwardly extending arms for cooperating with the drive plate to receive the excessive torque applied to the elastomeric member.

The drive plate and driven plate are each comprised of a generally flat, circular metal base having a tubular extension with an externally threaded portion welded to the center of the base. The drive plate further includes a plurality of flanges having drive surfaces whereby the flanges define slots along the circumference of the flat metal base. The cylindrical housing has a cylindrical outer surface and a cylindrical inner surface defining a cavity therein, a plurality of upwardly extending arms and an annular end opposite the upwardly extending arms. The driven plate forms the base of the inner cavity of the housing, and its circumference is attached to the housing by welding it to the inner surface defining the cavity. During normal operation the upper portions of the upwardly extending arms are contained within the slots formed along the external edge of the drive plate.

When the drill bit jams or snags, the rotation of the driven shaft slows or stops. The drive shaft is still turning, however, and the slowing of the driven shaft normally applies a high torque to the drive shaft. Some of this force or torque is absorbed by the annular body of resilient member included in the present invention because the annular body twists and deforms thereby reducing the amount of torque which is communicated to the drive shaft by the driven shaft. When the torque exerted on the annular body of resilient material reaches a predetermined amount, the resilient annular body rotates enough so that the drive surfaces of the flanges in the drive plate contact the upwardly extending arms of the lower housing. Once the drive surfaces contact the upwardly extending arms, the drive plate directly drives the lower housing and the driven plate preventing any additional torque from being placed on the resilient annular body. This prevents the resilient member from being exposed to an excessive torque which will overload or tear it.

Optionally, an annular lifting ring is provided to allow a predetermined limit to the upward extension of the elastomeric member when the control device is removed from the blast hole. The torque control device is removed from the blast hole by applying lifting force to the drive shaft which applies force to the drive plate and causes the annular body of resilient member to stretch. The lifting ring is mounted above the tipper plate, i.e. the drive plate, in the preferred embodiment, and is mounted on upper edges of the upwardly extending arms. When the annular body stretches a predetermined amount, the drive plate contacts the annular ring. This limits the upward travel of the drive plate and prevents further stretching of the resilient member thereby extending the life of the resilient member.

It is the object of the present invention to provide a torque control assembly for a rotary drilling machine which is simple and economical in design and which effectively dampens rotational torque, shock and vibrations encountered during drilling operations.

It is also an object of the invention to provide a torque control assembly capable of transmitting the torsional forces required for rotating the bit and which includes an annular body of resilient material for absorbing the torsional forces and vibration of the drill encountered during the down-hole drilling operation.

Another object of the invention is to provide such a torque control assembly wherein there is little possibility of tearing or breaking the resilient member, thereby extending the life of the resilient member.

Another object of the present invention is to provide a torque control device as described above having a drive plate attachable to a drive shaft, a driven plate attachable to a driven shaft a center portion including the resilient annular body of resilient material wherein the center portion couples the drive plate and driven plate and a torque-relief member which directly connects the drive plate to the driven plate in response to a predetermined amount of torque being applied to the driven plate, thus eliminating any additional torque from being applied to the annular body of resilient material.

Another object of the present invention is to provide a torque control device as described above wherein the torque-relief member comprises a housing welded to the driven plate, and flanges on the drive plate. The housing has upwardly extending arms or dog legs which are contained within slots defined by flanges formed in the upper plate during normal operation of the drilling machine. When a predetermined amount of torque is applied to the driven plate, the resilient annular member twists allowing edges of the flanges to physically contact the upwardly extending arms of the resilient member and enable the drive plate to directly drive the driven plate, after which it returns to its normal position where it absorbs shock and vibration.

Another object of the invention is to provide a torque control device as described above wherein the center portion is comprised of the annular body of resilient material, the annular body having upper and lower annular edges, and two circular metal plates wherein the upper annular edge is bonded to one of the plates and the lower annular edge is bonded to the other plate.

Additional objects, features and advantages will be apparent in the written description which follows and from the appended claims.

DETAILED DESCRIPTION OF A PREFERRED EMBODIMENT OF THE INVENTION

Figure 1:
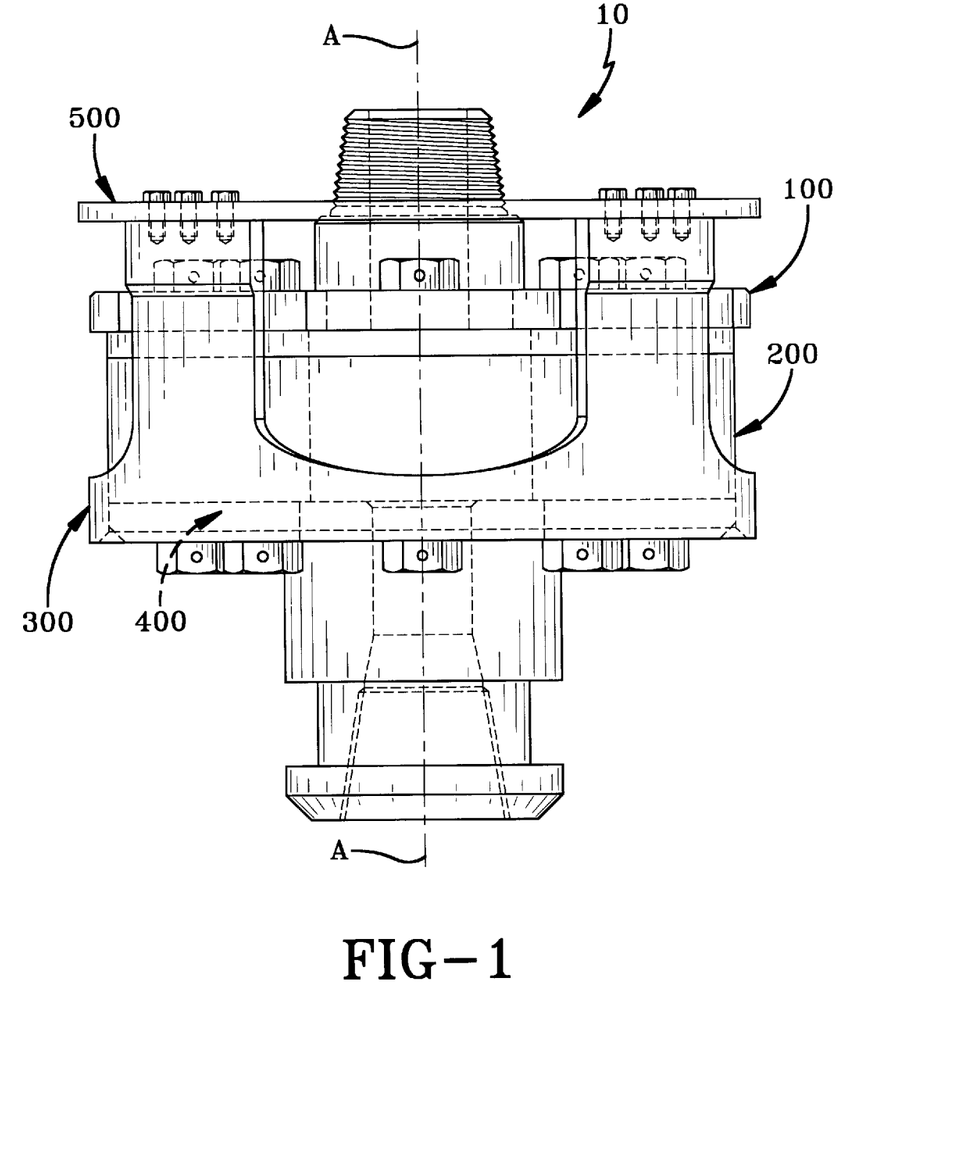
FIG. 1 is a side view of a torque control device for a shock absorbing apparatus used on a rotary drilling machine for mining in accordance with the present invention.

Turning now to the drawings where the purpose is for showing a preferred embodiment of the present invention, and not for limiting same, FIG. 1 shows a shock absorbing, vibration dampening torque control device in accordance with the teachings of the present invention. Torque control device 10 comprises an upper plate assembly 100, a central shock-absorbing portion 200, a housing 300, a lower plate assembly 400, and a lifting ring 500.

Figure 2:
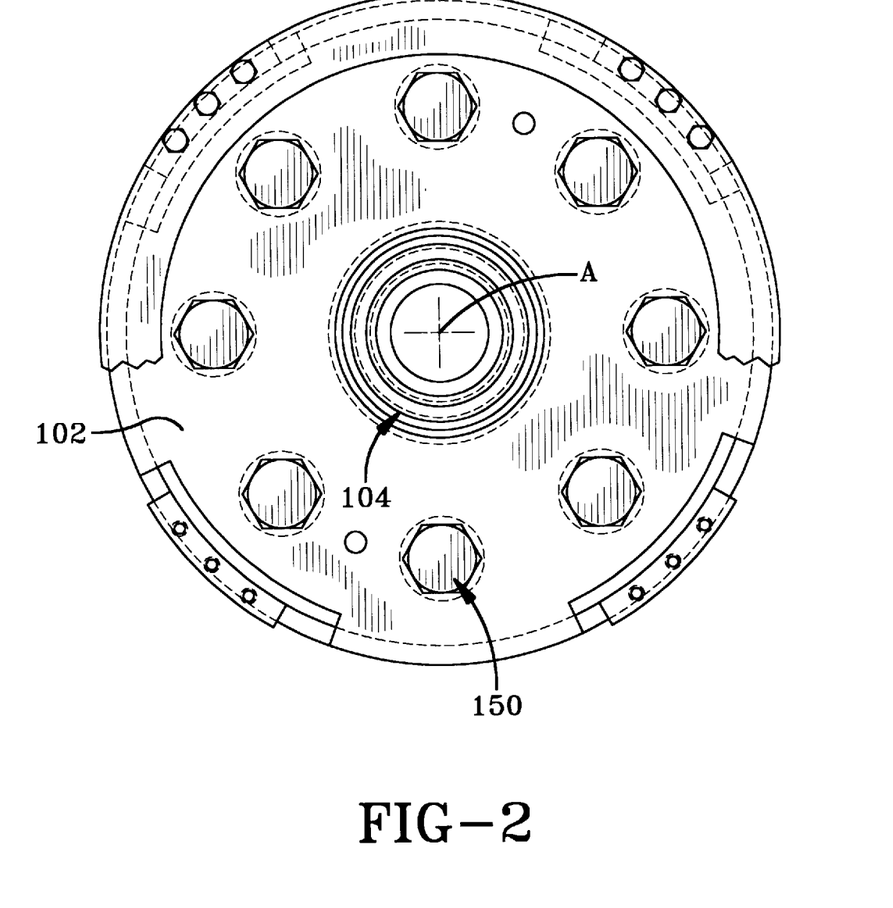
FIG. 2 is a top view of the device shown in FIG. 1.
Figure 3A:
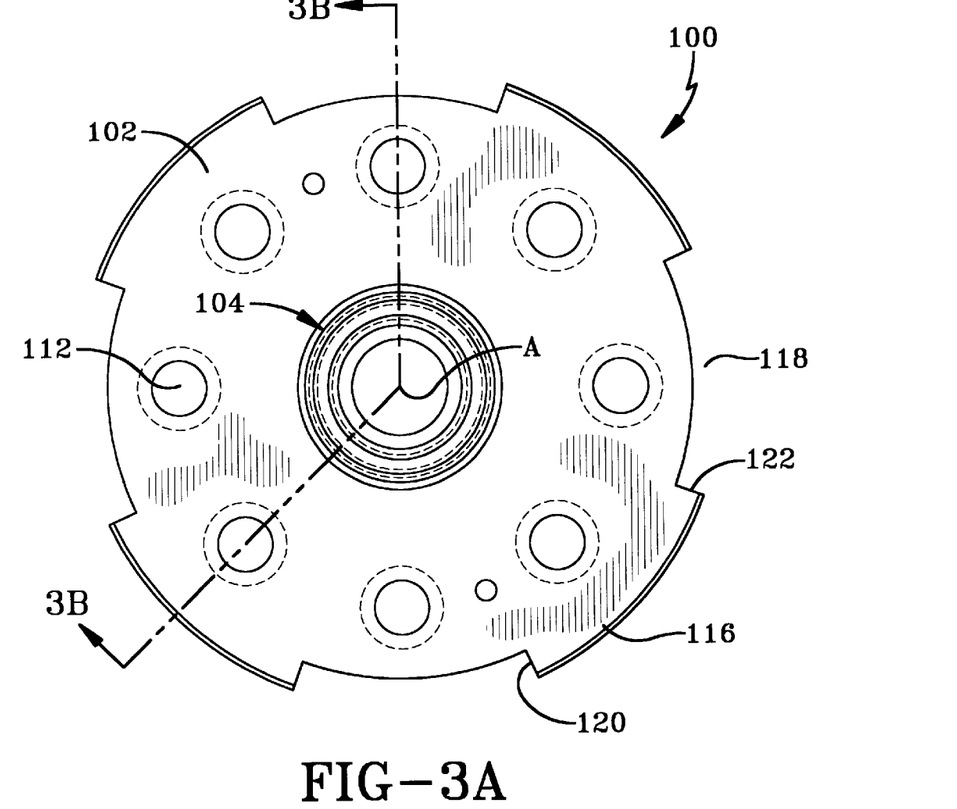
FIG. 3A is a top view of an tipper drive plate assembly used in the device of FIG. 1, with an externally threaded pin connection formed in the center thereof.
Figure 3B:
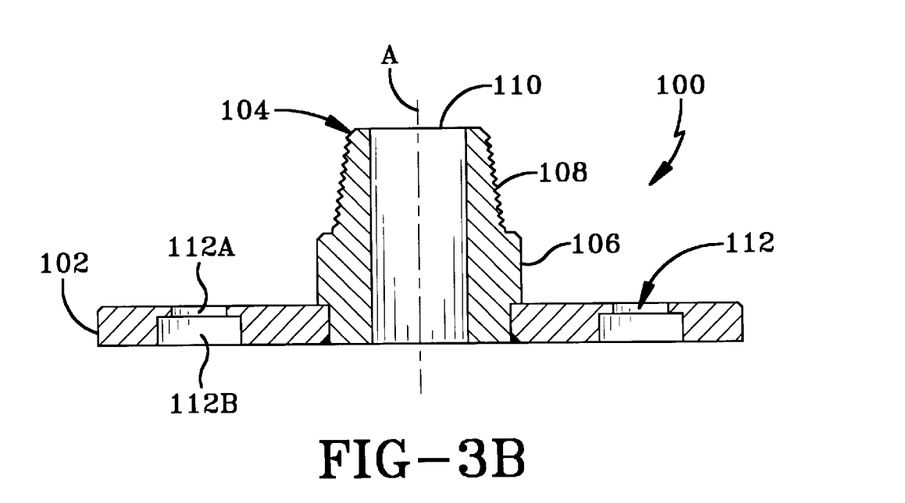
FIG. 3B is a view of the device shown in the direction of arrows A—A of FIG. 3A.
Figure 8A:
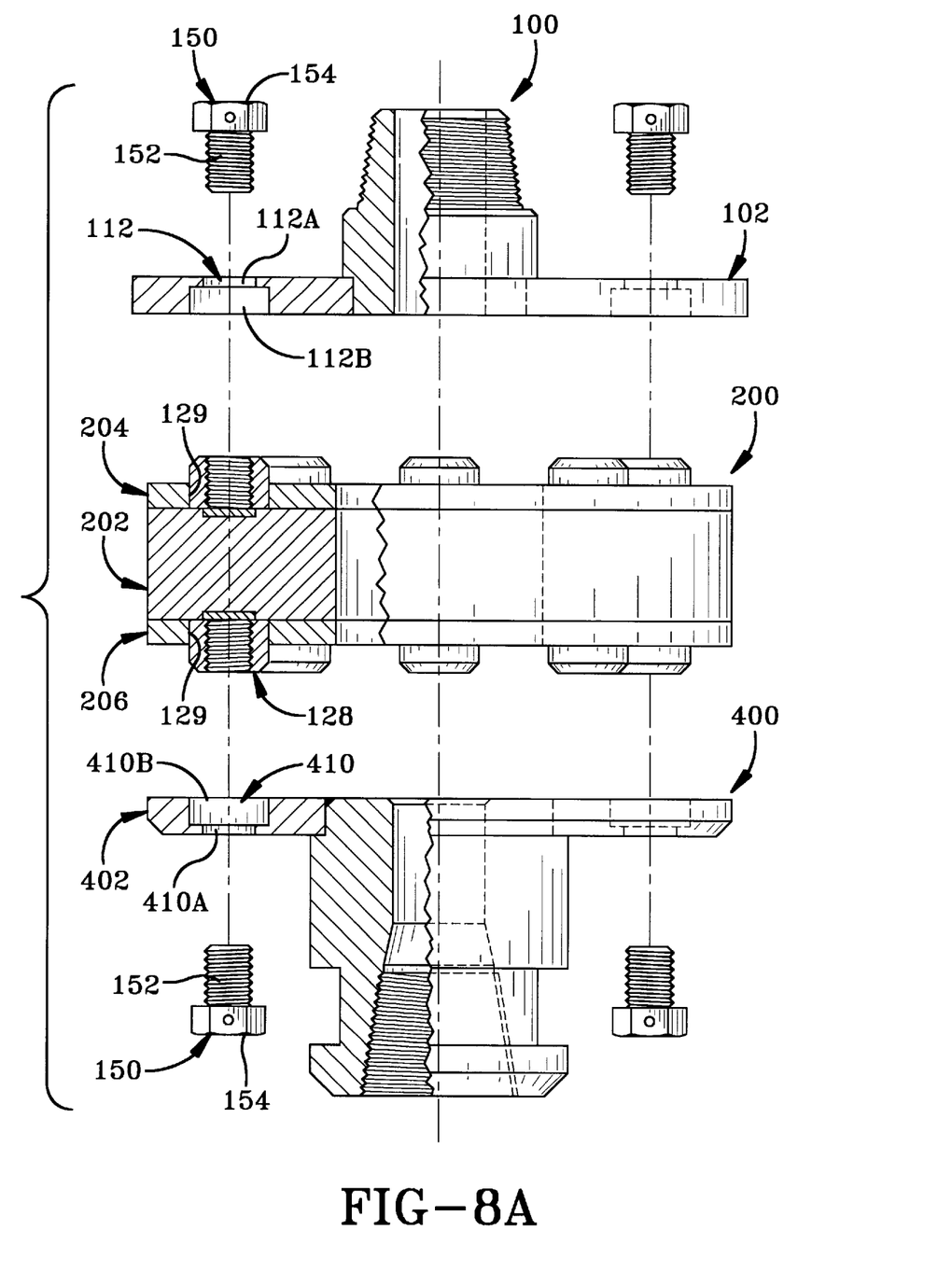
FIG. 8A is a partially exploded view of the torque control device of FIG. 1 with the housing removed.
Figure 8B:
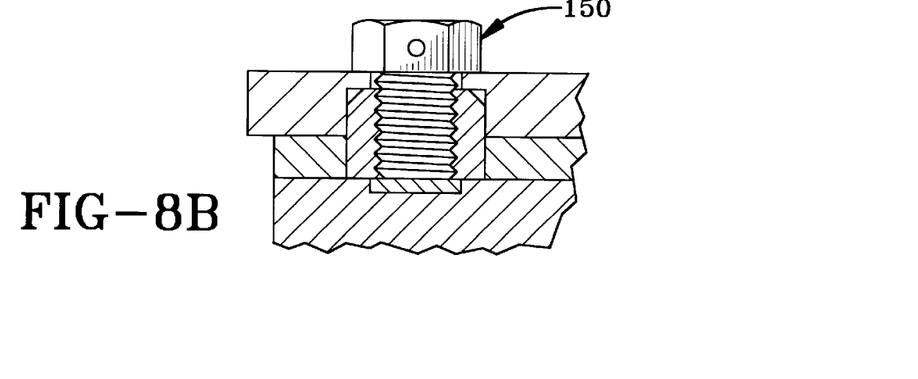
FIG. 8B is an enlarged sectional view of a fragment of the device shown in FIG. 8A illustrating a lug and bolt connection used in this device.

Upper plate assembly 100 is best seen in FIGS. 2, 3A and 3B and includes a generally flat circular metal plate 102 formed about a central axis A and an upwardly extending metal tubular portion or externally threaded pin connection 104 for connection to the drive shaft of a rotary drilling machine. Pin connection 104 is centrally mounted in plate 102 and extends along a central axis A. In the preferred embodiment, pin connection 104 is welded to plate 102 and is made of 41/40 series steel. Pin connection 104 has a wide base portion 106 adjacent plate 102 and a narrower, tapered externally threaded neck portion 108. Bore 110 extends centrally into pin connection 104 along axis A for air passage as is best seen in FIG. 3B. Plate 102 has a plurality of equally radially-spaced circular counterbored holes or apertures 112 positioned equidistant from axis A and dimensioned to receive lugs and bolts 150, as best seen in FIGS. 8A and 8B. In the preferred embodiment, plate 102 contains eight counterbored holes 112 having upper aperture portions 112A dimensioned to receive bolts 150 and lower recesses 112B, which are best seen in FIGS. 3B and 8A, dimensioned to receive lugs 128. Lower recesses 112B communicate with tipper aperture portions 112A whereby lower recesses 112B open to the bottom of plate 102. As best seen in FIG. 3A, flanges 116 are formed along the outside circumference of plate 102 thereby defining slots 118. Flanges 116 include clockwise drive surfaces 120 and counterclockwise drive surfaces 122.

Figure 4A:
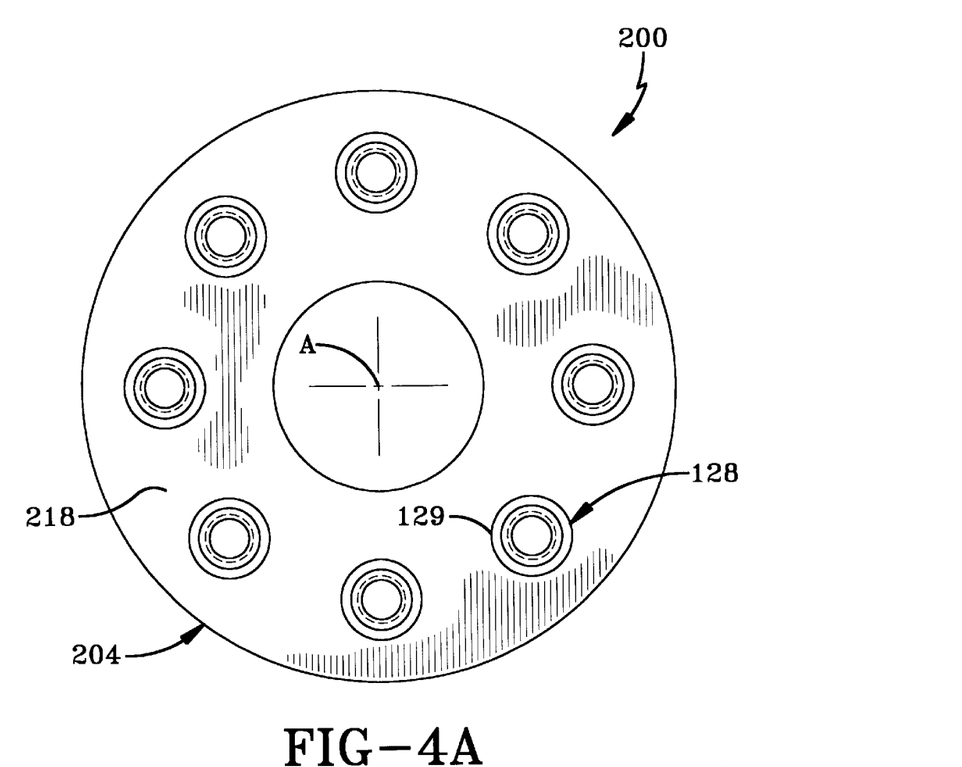
FIG. 4A is a top view of a center portion including a resilient member used with the present invention.
Figure 4B:
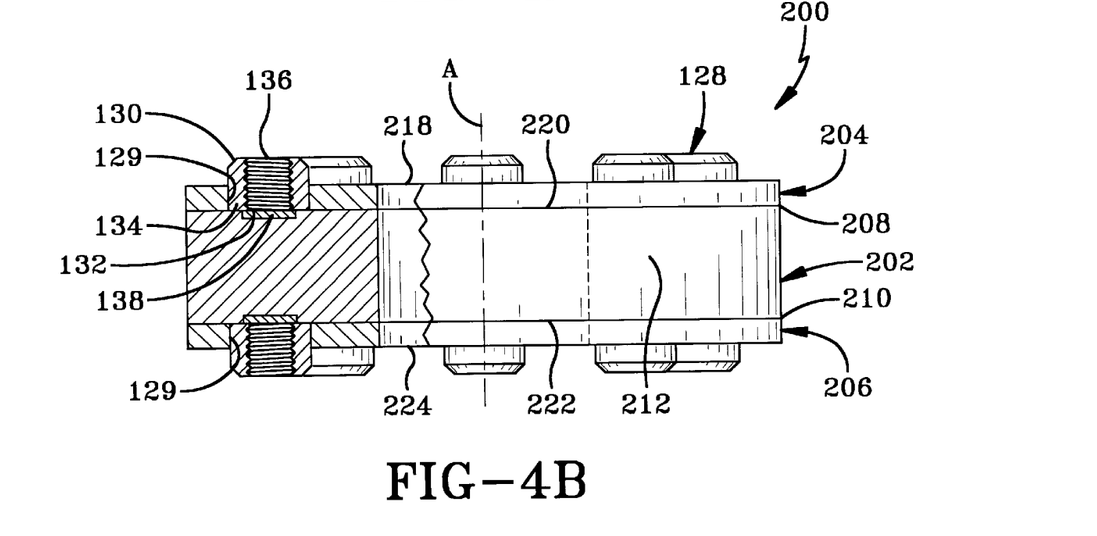
FIG. 4B is a partially sectional side view of the center portion shown in FIG. 4A.

Turning now to FIGS. 4A and 4B, center portion 200 is best seen. Center portion 200 is centrally disposed about axis A and is comprised of an annular member of elastomeric material 202, an upper coupling plate 204 and a lower coupling plate 206. Elastomeric member 202 has an upper annular edge 208, a lower annular edge 210, a cylindrical outer surface 212 and a cylindrical inner surface defining a cavity (not shown). Upper coupling plate 204 has an upper planar surface 218 and a lower planar surface 220. Lower coupling plate 206 has an upper planar surface 222 and a lower planar surface 224. Coupling plates 204 and 206 are preferably made from machine grade steel. Upper annular edge 208 of resilient member 202 is bonded to the lower planar surface 220 of upper coupling plate 204. Lower annular edge 210 of resilient member 202 is bonded to the upper planar surface 222 of lower coupling plate 206. Upper plate 204 and bottom plate 206 contain lugs 128 having beveled upper and lower ends and disposed equidistant about axis A and disposed radially equidistant from one another. Lugs 128 are disposed in apertures 129. In a preferred embodiment, plates 204 and 206 each have eight lugs 128 whereby the lugs 128 in upper coupling plate 204 are positioned so as to align with apertures 112 in plate 102 of upper plate assembly 100 and the lugs 128 in lower coupling plate 206 are positioned so as to align with apertures 410 in plate 402 of lower plate assembly 400, which is described below.

As best seen in FIGS. 4A, 4B, 8A and 8B, lugs 128 are cylindrical and have a length of approximately 2½ times the thickness of coupling plates 204 and 206, the plates preferably being of equal thickness for the purpose of simple and efficient manufacturing. The upper end of lug 128 has a chamfered rim 130, and a lower end 132 of lug 128 has a smaller chamfered rim 134 welded to close off bore 136.

Lugs 128 have axial bores 136 extending therethrough, the bore being threaded. Lugs 128 are received snugly in apertures 129. Lugs 128 are positioned in and welded to the surface defining apertures 129 in upper coupling plate 204 with the bottom ends 132 flush with the lower planar surface 220. Lugs 128 are positioned in and welded to the surface defining apertures 129 in lower coupling plate 206 with the lower ends 132 flush with the upper planar surface 222 of plate 206. A relatively thin disc 138 is affixed to the bottom of the lugs by welding thus closing the inner end of the bore 136.

Turning to FIGS. 8A and 8B, lug bolts 150 have an elongated threaded shank 152, and a head 154.

Figure 6A:
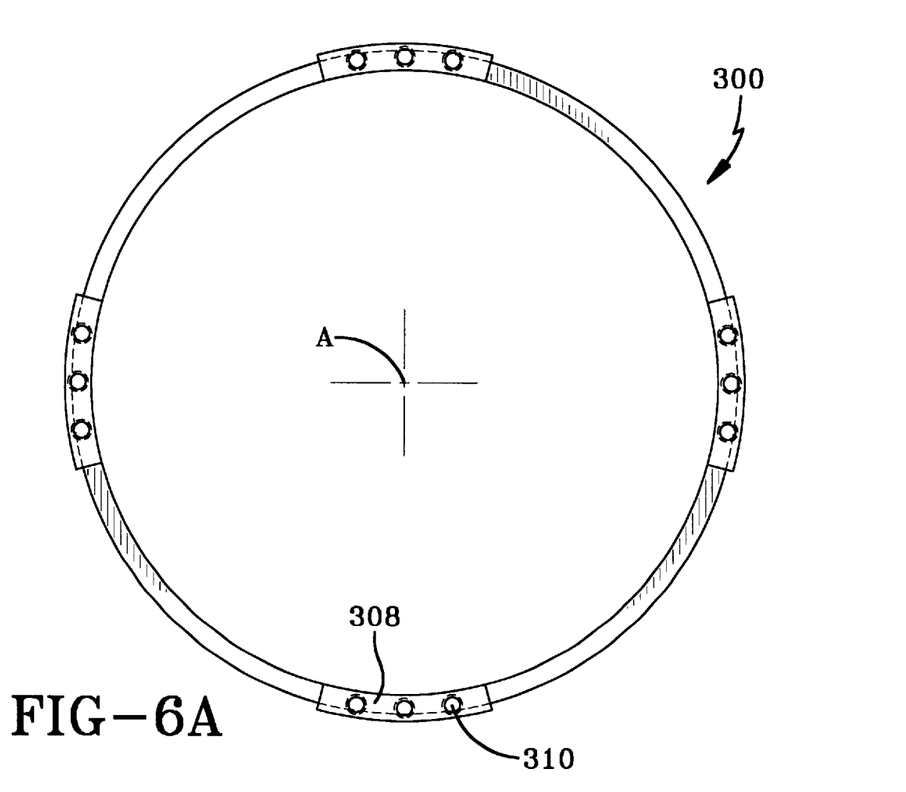
FIG. 6A is a top view of tile cylindrical housing shown in FIGS. 5A and 5B.
Figure 6B:
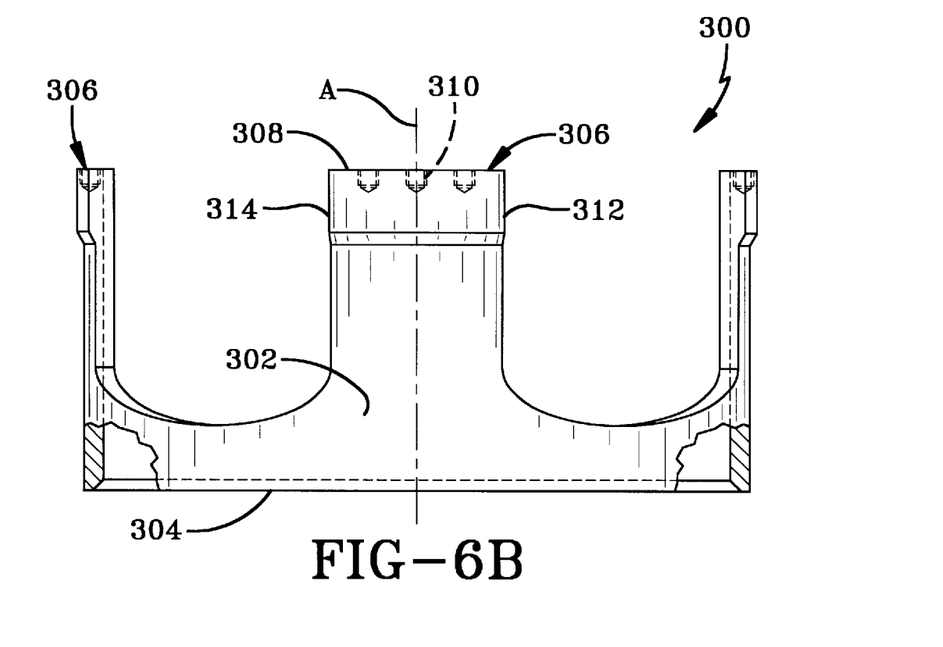
FIG. 6B is a side view of the housing shown in FIG. 6A.

Housing 300, shown in detail in FIGS. 6A and 6B, is comprised of lower cylindrical body 302 which has an annular lower rim 304 and defines a cavity within. Four upwardly extending load arms or dog legs 306 extend from housing 300 opposite lower annular rim 304 and extend upward from cylindrical body 302 in a direction generally parallel to axis A. Upwardly extending arms 306 are formed at 90° relative to one another along the circumference of cylindrical body 302 and, therefore, are equally spaced about the circumference of housing 300 and have tipper lateral edges 308 with threaded circular apertures 310 formed therein. Additionally, each upwardly extending arm 306 includes a clockwise driven surface 312 extending along one longitudinal edge and a counterclockwise driven surface 314 extending along the opposing longitudinal edge.

Figure 7A:
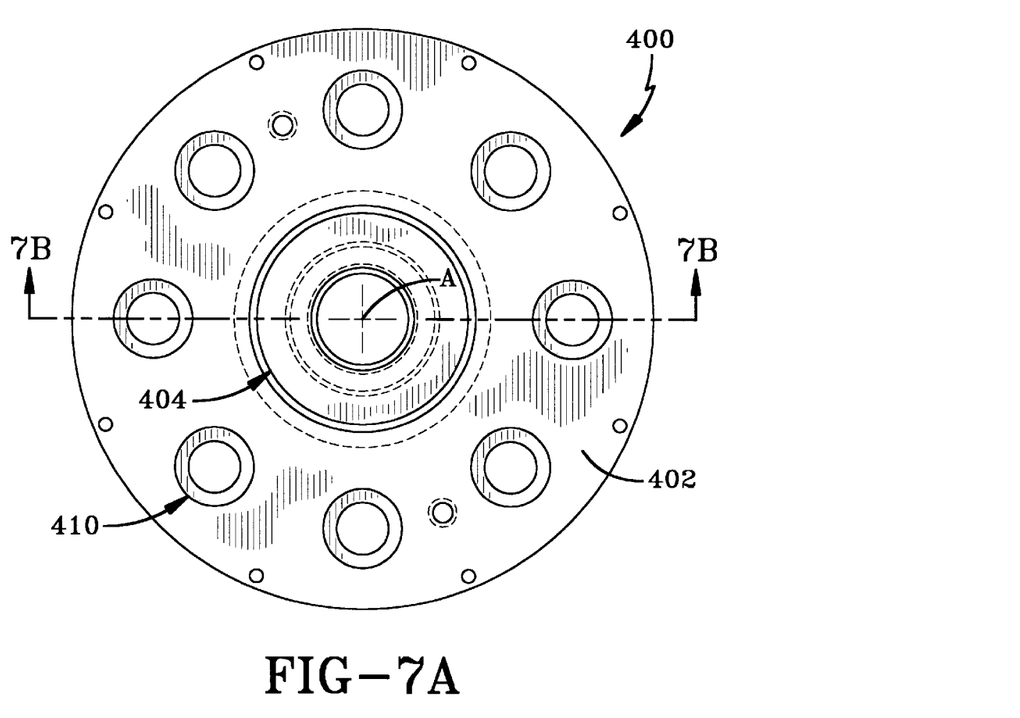
FIG. 7A is a plan view of the lower driven plate assembly with a internally threaded box connection formed in the center thereof.
Figure 7B:
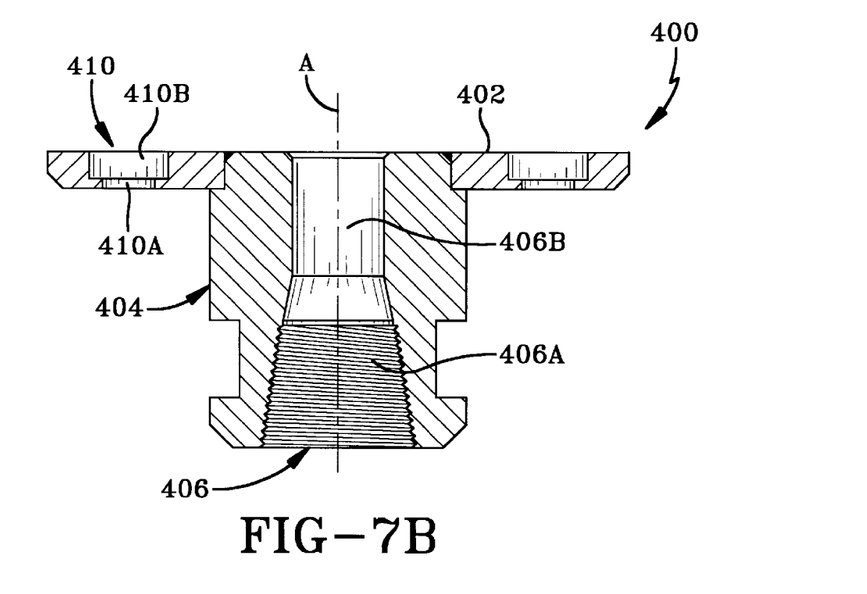
FIG. 7B is a sectional view in the direction of arrows 7B shown in FIG. 7A.

Turning now to FIGS. 7A and 7B, lower plate assembly 400 is comprised of a generally flat circular plate 402 and an elongated tubular section or internally threaded box connection 404 extending downward along axis A. In a preferred embodiment, box connection 404 is welded to the center of plate 402 and is made from 41/40 series steel. Box connection 404 has a threaded bore 406 located centrally therein extending along axis A. Bore 406 has a tapered entrance portion 406A and a narrow, straight internal air passage 406B. A plurality of apertures 410 are radially disposed about axis A in plate 402. Apertures 410 are circular and dimensioned to receive lugs 128 and bolts 150. In a preferred embodiment, plate 402 contains eight apertures 410, wherein apertures 410 have lower aperture portions 410A and upper recesses 410B communicating therewith, upper recesses 410B opening to the top of plate 402. The eight apertures 410 are positioned so as to align with apertures 210 in lower coupling plate 206.

In the preferred embodiment, upper plate assembly 100 and lower plate assembly 400 are axially aligned along axis A and are disposed in vertical, parallel relation to one another.

In the preferred embodiment, lugs 128, housing 300 and plates 102 and 402 are formed from a softer steel than the steel from which pin connection 104 and box connection 404 are made. The softer steel is not hardened and will deform in the event of a snag. This further helps to absorb the torque exerted when the drill bit jams, which is described in more detail below, and reduces the stress placed on the threads in pin connection 104 and box connection 404.

Figure 9A:
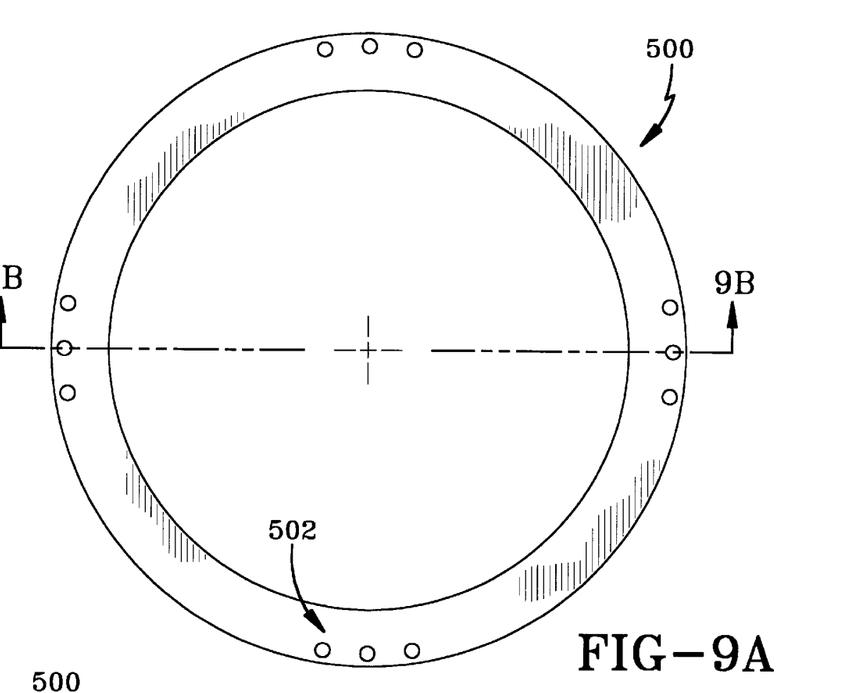
FIG. 9A is a top view of the lifting ring.
Figure 9B:
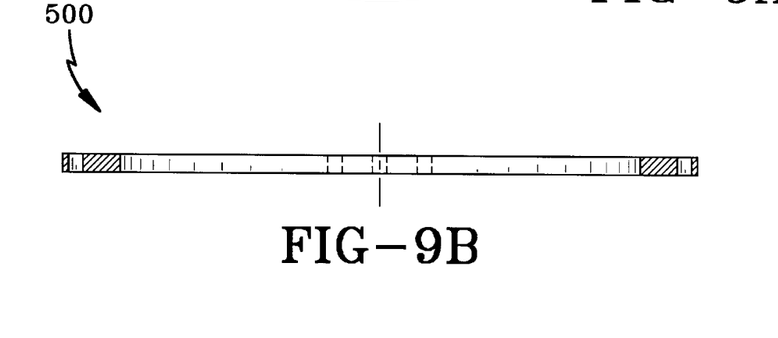
FIG. 9B is a sectional view taken along line 9B—9B of FIG. 9A.

Lifting ring 500, as is best seen in FIGS. 9A and 9B, is comprised of a generally flat circular steel ring. Ring 500 has four sets of apertures 502, each set having three apertures and being positioned so as to align with apertures 310 formed in upper lateral edges 308 of upwardly extending arms 306. Sets 502 are, therefore, disposed at 90° relative to each other along the circumference of ring 500.

Turning now to FIGS. 4B and 8A, the assembly of device 10 is best illustrated. Center portion 200 is formed in a separate process in which annular elastomeric body 202 is bonded and cured to upper metal plate 204 and lower metal plate 206 with upper annular edge 208 being bonded to the lower planar surface 220 of plate 204 and lower annular edge 210 being bonded to the upper planar surface 222 of plate 206. Lugs 128 are positioned in apertures 129 in coupling plates 204 and 206 and are welded into place, as described above.

Referring to FIGS. 8A and 8B, upper drive plate assembly 100 is then aligned with the center portion 200 so that apertures 112 having lower recesses 112B align with apertures 129 in upper coupling plate 204, which have lugs 128 mounted therein. Upper drive plate assembly 100 is fitted onto plate 204 so that lugs 128 are contained within recesses 112B. Lug bolts 150 are inserted into apertures 112A and threaded into lugs 128 by means of threads 136 to secure upper plate assembly 100 to tipper plate 204 of center portion 200.

Figure 5A:
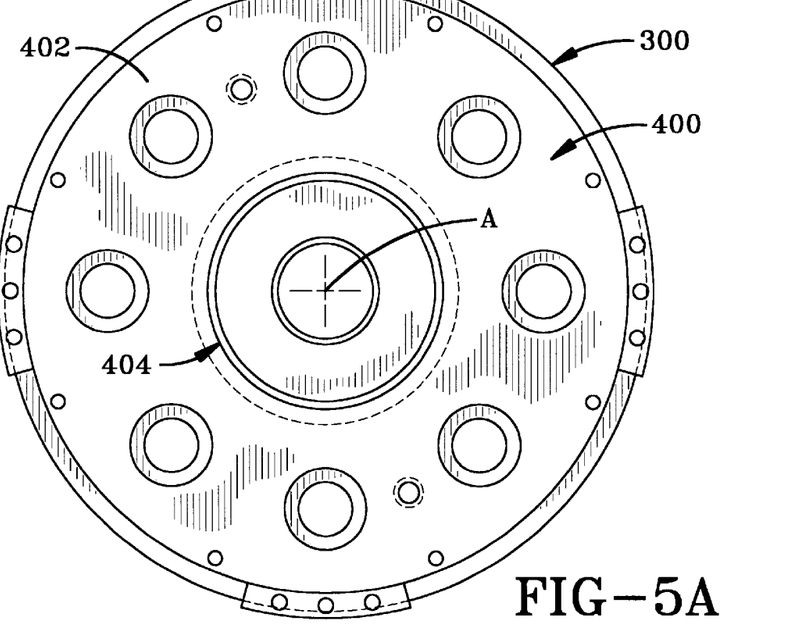
FIG. 5A is a plan view of a lower driven plate assembly of the device of FIG. 1 with a cylindrical housing welded thereto.
Figure 5B:
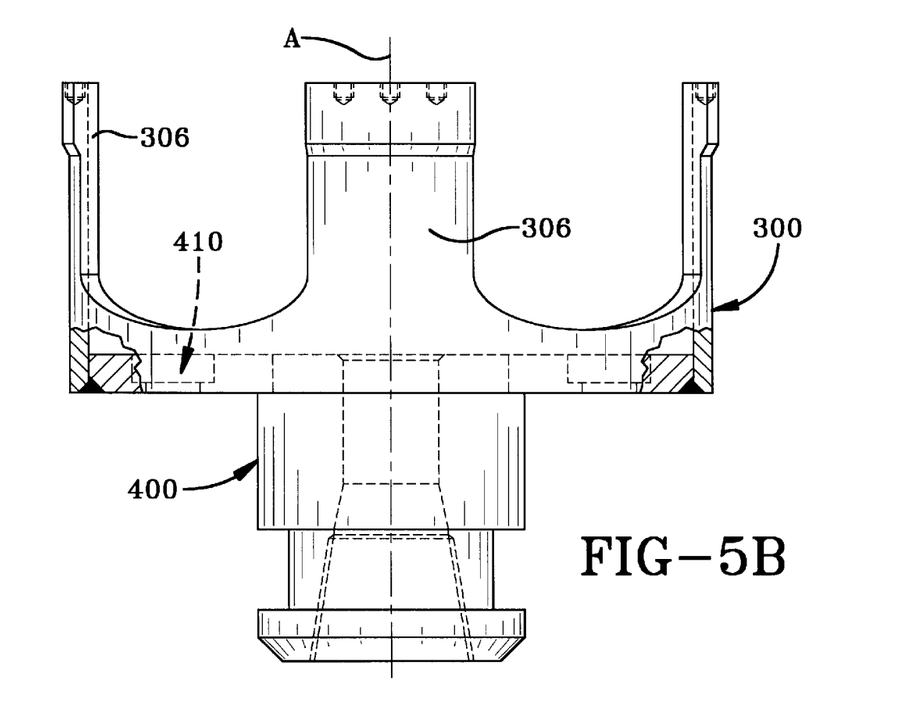
FIG. 5B is a side view of the lower driven plate assembly and housing shown in FIG. 5A, illustrating a box connection formed in the center thereof to which a drill pipe can be attached.

Lower plate assembly 400 is welded to housing 300, shown in FIGS. 5A and 5B in a separate operation. As seen in FIG. 8A, lower plate assembly 400 is aligned with the center portion 200 so that apertures 410 having upper recesses 410B align with apertures 129 in lower coupling plate 206, which have lugs 128 mounted therein. In this position the upper portion of upwardly extending arms 306 are contained within the slots 118 formed in upper plate assembly 100. Plate assembly 400 engages plate 206 so that lugs 128 are contained within recesses 410B. Lug bolts 150 are inserted into apertures 410A and threaded into lugs 128 to secure lower plate assembly 400 to center portion 200.

Finally, ring 500, shown in FIGS. 9A and 9B, is positioned over the upper edges 308 of upwardly extending legs 306 so that apertures 502 align with apertures 310, shown in FIG. 6A. Threaded fasteners 504 (see FIG. 10A) then fasten ring 500 to edges 308 of arms 306.

After torque-control device 10 has been assembled, it is installed on the drive shaft. The driven shaft of the rotary drilling machine is then attached. The drive shaft has an internally threaded lower end which receives the externally threaded portion of the pin connection 104 of tipper drive plate assembly 100. The driven shaft has an externally threaded upper end which is received in threaded bore 406 of box connection 404 of lower plate assembly 400. Once fastened to the drive shaft and driven shafts, device 10 functions as a shock absorbing, vibration dampening coupling, transmitting rotational torque from the drive shaft to the driven shaft.

Figure 10A:
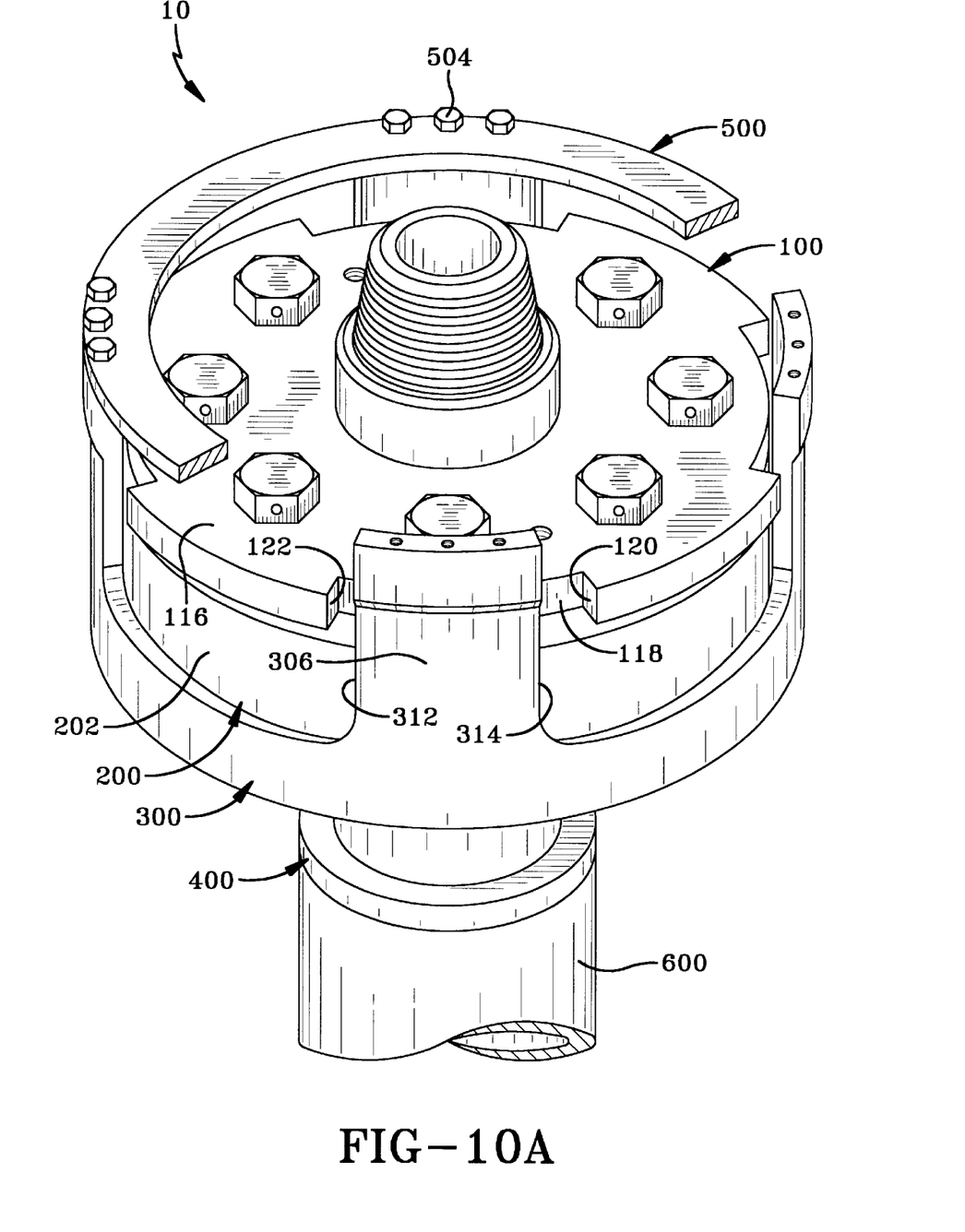
FIG. 10A is a top perspective view showing the device in its normal operating position.

Turning now to FIGS. 10A, 10B 10C, 10D and 10E, the operation of device 10 is illustrated. In FIG. 10A device 10 is in a preferred normal operating position. In this position, upwardly extending legs 306 are positioned within slots 118 so that the centers of legs 306 are positioned a predetermined distance from the clockwise drive surfaces 120 of flanges 116 and are positioned a predetermined and lesser distance from the counterclockwise drive surfaces 122 of flanges 116. During normal operation, the drive shaft transmits torsional force to upper plate assembly 100, causing assembly 100 to turn, which drives the central resilient member 200 which, in turn, drives lower plate assembly 400. Lower plate 400 transmits the torque and rotational motion to drill shaft means, which includes a driven shaft or drill pipe 600 and a drill bit attached to the lower end of member 600.

Figure 10B:
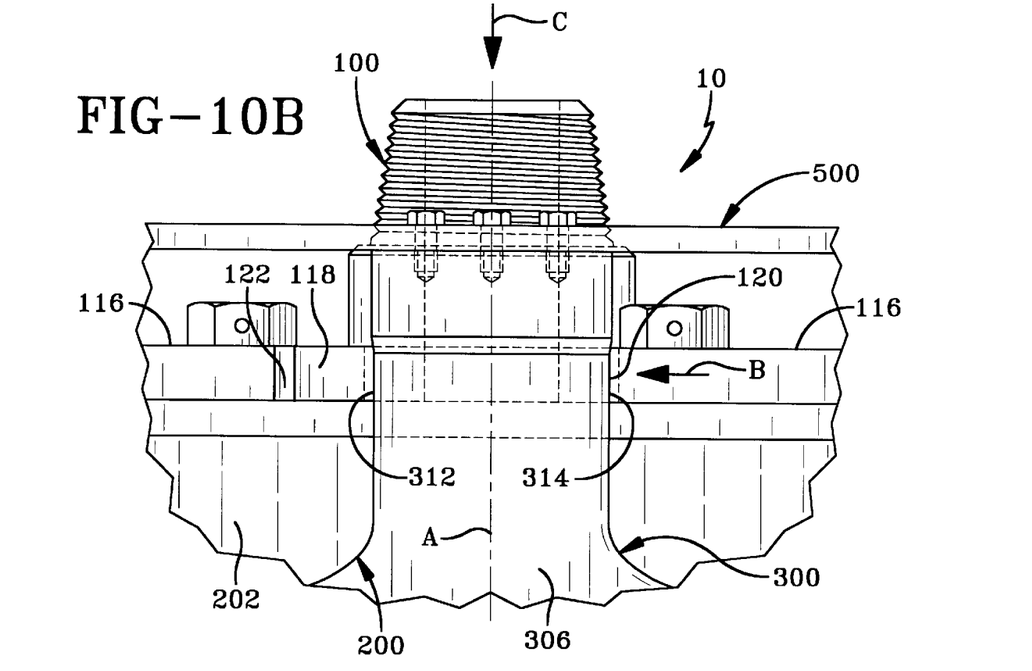
FIG. 10B is a partial, enlarged side view of the device shown in FIG. 10A when the drill is operating in forward and a snag has caused clockwise drive surfaces of the drive plate flanges to physically contact the arms of the housing.

FIG. 10B represents a typical drilling situation in which the drive shaft is turning in a clockwise direction, shown by arrow B, and applying downward force, shown by arrow C, to device 10 thereby compressing elastomeric member 202. In the situation illustrated, the drill hit has snagged or jammed in a rock formation. When this occurs, the driven shaft or drill pipe stops rotating or slows in its rotation thus causing lower plate assembly 400 (not shown) and housing 300, which is welded to assembly 400, to stop or slow in their rotation. Upper plate assembly 100, however, is still being driven by the drive shaft. To lessen the torsional force exerted on the drive shaft by the drill bit jamming, the annular elastomeric body 202 of central shock and torque-absorbing portion 200 twists or deforms to absorb some of the torsional force. If the annular elastomeric body 202 were to twist too far, however, it could stretch too far and even tear in half. To prevent elastomeric body 202 from twisting too far in this situation, clockwise drive surfaces 120 on flanges 116 and lower housing 300 with arms 306 having driven surfaces 314 are provided. When elastomeric body 202 twists a predetermined amount, clockwise drive surface 120 contacts clockwise driven surface 314 of upwardly extending legs 306. Once drive surface 120 contacts driven surface 314 upper drive plate assembly 100 directly drives lower driven plate assembly 400 thus preventing any additional torsional force from being applied to annular elastomeric body 202. Once the drill bit is freed from the snag, the excess torque is removed from annular elastomeric body 202, body 202 rebounds, returning to its original shape. This returns upwardly extending arms 306 to their original position within slots 118.

Figure 10C:
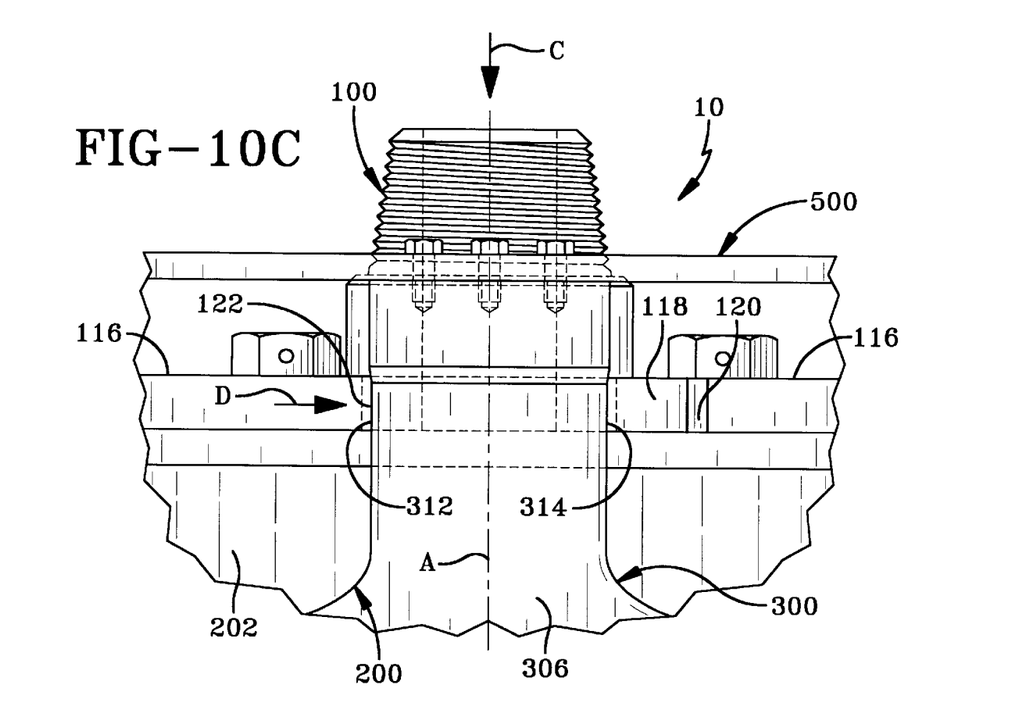
FIG. 10C is a partial, enlarged side view of the device shown in FIG. 10A when the drill is operating in reverse to free the bit causing counterclockwise drive surfaces of the drive plate flanges to physically contact the arms of the housing.

FIG. 10C represents the situation when the drill is being operated in reverse to free the drill bit from a snag. The drive shaft and driven shaft are being rotated in the counterclockwise direction, shown by arrow D, while downward force, shown by arrow C, is applied to device 10 by the drive shaft thereby compressing elastomeric member 202. In this situation, when the drill bit snags or jams, the lower plate assembly 400 (not shown) and housing 300 stop or slow in their counterclockwise rotation. Upper plate assembly 100 is still driven by the drive shaft and twists annular elastomeric body 202 until counterclockwise drive surfaces 122 contact counterclockwise driven surfaces 312 of upwardly extending legs 306. Once drive surface 122 contacts driven surface 312 upper drive plate 100 directly drives lower driven plate 400 and eliminates any additional torsional force from being applied to annular elastomeric body 202. Once the drill bit is freed from the snag, annular elastomeric body 202 returns to its original shape thereby returning upwardly extending arms 306 to their original position, within slots 118.

Figure 10D:
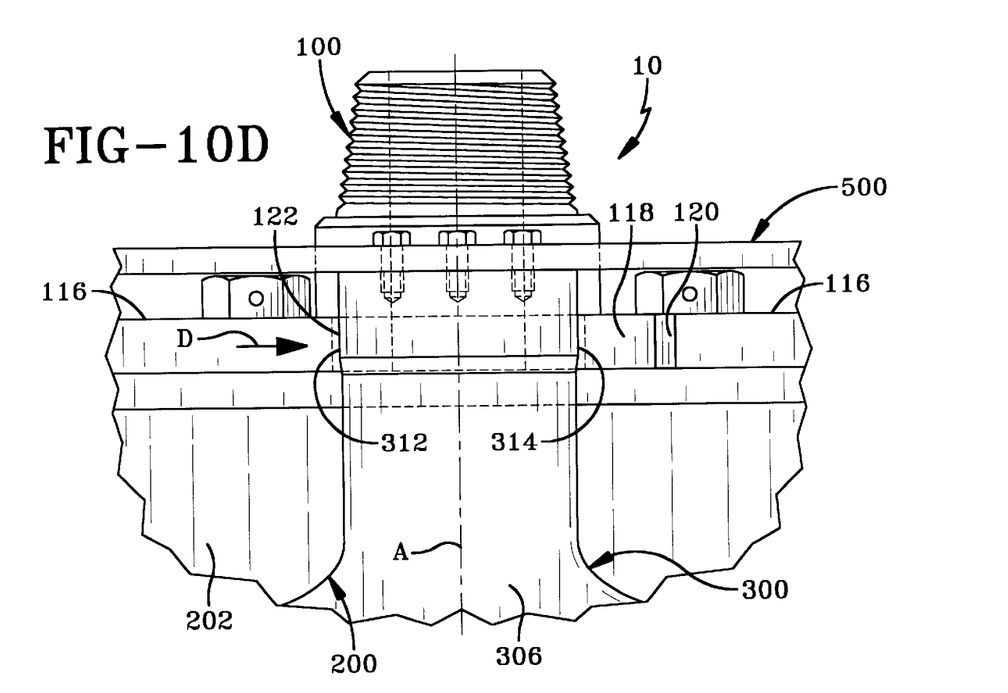
FIG. 10D is a partial, enlarged side view of the device shown in FIG. 10A when the drill is operating in reverse to break out the threads along the drive shaft and driven shaft, causing the counterclockwise drive surfaces of the drive plate flanges to physically contact the arms of the housing.

FIG. 10D represents the situation when the drill has been removed from the blast hole and is operated in reverse mode to break out threaded connections, and is therefore being rotated in the counterclockwise direction. In this situation no downward force is applied to device 10. The drill pipe is contained by breakout wrenches to stop the driven shaft and lower plate assembly 400 (not shown) and housing 300 in their counterclockwise rotation. Upper plate assembly 100 is still driven by the drive shaft and twists annular elastomeric body 202 until counterclockwise drive surfaces 122 contact counterclockwise driven surfaces 312 of upwardly extending legs 306. Once drive surfaces 122 contact driven surfaces 312 upper drive plate 100 directly drives lower driven plate 400 and eliminates any additional torsional force from being applied to annular elastomeric body 202. Counterclockwise drive surface 122 is positioned closer to driven surface 312 than clockwise drive surface 120 is positioned to driven surface 312 so that, when the drill is operating in reverse, less torque is required for drive plate assembly 100 to directly drive the driven plate assembly 400. This makes it easier to "break the threads" along the entire shaft, thus making disassembly easier, i.e. making it easier to unscrew device 10 from the drive shaft and drill pipe once the device has been removed from the blast hole.

Figure 10E:
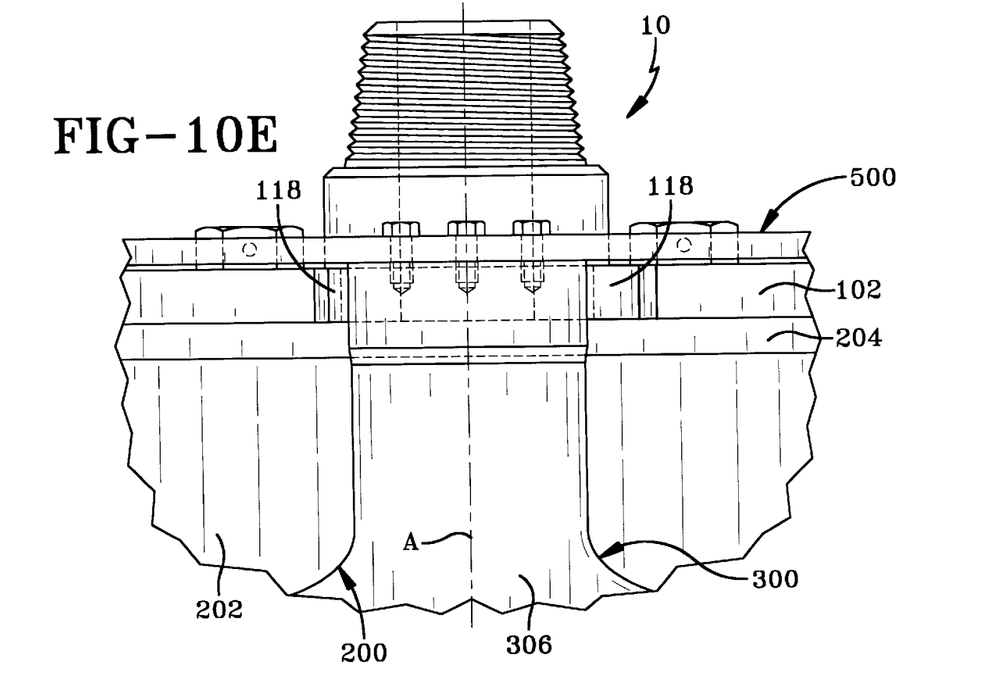
FIG. 10E is a partial, enlarged side view of the device shown in FIG. 10A when it is being lifted out of a blast hole and the lifting force has caused the resilient member to stretch so that the drive plate physically contacts the lifting ring.

FIG. 10E shows a situation in which the device is being removed from the blast hole by applying lifting force to the drive shaft. As the force lifts the device from the hole, annular elastomeric body 202 stretches in the direction defined by axis A. When annular elastomeric body 202 stretches a predetermined amount, flat circular metal plate 102 of upper plate assembly 100 contacts lifting ring 500. Lifting ring 500 prevents further movement of plate 102 thus preventing annular elastomeric body 202 from stretching further. In a preferred embodiment, lifting ring 500 is positioned a predetermined distance above circular plate 102.

The torque-control device above is simple in design and economical to manufacture. The device absorbs torque caused by the jamming of the drill bit thereby lengthening tile life of the drill bit, the drive shaft and other components. The housing and the upper plate are structured as to limit the amount of force placed on the resilient member thereby prolonging the life of the member.

While the invention has been shown in only one of its forms, it is not thus limited but is susceptible to various changes and modifications without departing from the spirit thereof.

What is claimed is:

1. A device for reducing the deleterious torque in a shock absorbing, rotary drive coupling unit for connecting a drive shaft and a driven shaft in a rotary mine drilling machine, said device comprising:

drive plate means connectable to the drive shaft of the rotary drilling machine for rotating with the drive shaft and for transmitting the motion of the drive shaft;

driven plate means connectable to the driven shaft for being rotated by the drive shaft and for rotating the driven shaft;

a shock and torque-absorbing portion fastened to said drive plate means and fastened to said driven plate means, said shock and torque-absorbing portion comprising elastomeric material for transmitting torque between said drive plate means and said driven plate means;

torque-relief means operatively connected to said drive plate means and said driven plate means for limiting the torque placed on said shock and torque-absorbing portion, said torque-relief means including:

at least one first engagement means operatively connected to said drive plate means for driving said driven plate means in response to a predetermined amount of torque being applied to said driven plate means, and at least one second engagement means connected to said driven plate means for cooperating with said first engagement means to drive said driven plate, wherein said first engagement means contacts said second engagement means and said drive plate means, and relieves the torque on said shock and torque-absorbing portion and directly drives said driven plate means in response to a predetermined amount of torque being applied to said driven plate means, said predetermined amount of torque being selected to avoid torque-related damage to said elastomeric material from heavy loads; and tensile-force relief means connected to said driven plate means and having a portion mounted above said drive plate means and being operatively connected to said driven plate means, said drive plate means contacting said tensile-force relief means and being restrained from further upward movement in response to a predetermined lifting force applied to said drive plate means.

2. A device as described in claim 1 wherein said torque-relief means is comprised of a housing operatively connected to said driven plate means, said housing having said second engagement means, and flange means having said at least one first engagement means and being operatively connected to said drive plate means, said flange means engaging said housing in response to a predetermined torque placed on said shock and torque-absorbing portion.

3. A device as described in claim 2 wherein said second engagement means is comprised of at least one arm means extending from said housing, said arm means being engageable by said first engagement means for driving said driven plate means.

4. A device as described in claim 1 wherein said device further comprises a tensile-force relief means, said tensile-force relief means being connected to said driven plate means and having a portion mounted above said drive plate and being operatively connected to said driven plate means, said drive plate means contacting said tensile-force relief means and being restrained from further upward movement in response to a predetermined lifting force applied to said drive plate means.

5. A device as described in claim 4 wherein said torque-relief means comprises a housing operatively connected to said driven plate, said second engagement means is comprised of at least one arm extending from said housing, and said tensile-force relief member is connected to said at least one arm.

6. A device as described in claim 5 wherein said tensile-force relief means is an annular ring.

7. A device as described in claim 1 wherein said drive plate means includes a flat, circular plate with an externally threaded pin connection fixed thereto, said pin connection having a threaded external portion wherein an internally threaded end of the drive shaft is drivingly connected, and said driven plate means includes a flat, circular plate with an internally threaded box connector fixed thereto, said box connector having a threaded bore wherein an externally threaded end of the driven shaft is drivingly received in said bore of said box connector.

8. A device as described in claim 7 wherein said drive plate means and said driven plate means are formed from steel, the steel forming said pin connection being harder than the steel forming said flat, circular plate of said drive plate means, and the steel forming said box connector being harder than the steel forming said flat, circular plate of said driven plate means.

9. In an apparatus for a rotary mine drilling machine for drilling a hole with a drill shaft means, the apparatus including a torque control device for absorbing the shock and torque between a drive shaft means and a driven shaft means of the rotary mine drilling machine, said torque control device comprising:

drive plate means connectable to the drive shaft means, said drive plate means rotating in response to the rotation of the drive shaft means and having at least one outwardly extending flange;

a driven plate means connectable to the driven shaft means;

a center portion fastened to said drive plate means and fastened to said driven plate means to couple said drive plate means and said driven plate means, said center portion including deformable shock, vibration and torque-absorbing means, said deformable shock, vibration and torque-absorbing means transmitting force loads and torque loads between said drive plate means and said driven plate means; and at least one torque-relief means connected to and extending from said driven plate means, said torque-relief means being engageable with said at least one outwardly extending flange of said drive plate means to relieve the torque loads on said deformable shock, vibration and torque-absorbing means, in response to a predetermined torque load placed on said deformable shock, vibration and torque-absorbing means, said predetermined torque load being selected to avoid torque-related damage from heavy loads;

wherein the drive shaft means is upwardly movable to lift a drill bit from the hole being drilled, said upward movement lifting said drive plate means and putting tension on said deformable shock, vibration and torque-absorbing means, and wherein said apparatus further includes a tensile-force relief means connected to said driven plate means, said tensile-force relief means being spaced from said drive plate means and located in the path of movement of said drive plate means as said drive plate means is lifted by the drive shaft means by a distance for blocking continued movement of said drive plate means to prevent further lifting of said drive plate means when said drive plate means engages said shock, vibration and torque-absorbing means, to avoid damage from the tension on said shock, vibration and torque absorbing means.

10. A device as described in claim 9 wherein said torque-relief means is comprised of a cylindrical housing operatively connected to said driven plate means, said housing having at least one upwardly extending arm, and said at least one outwardly extending flange on said drive plate means engages said arm in response to a predetermined torque placed on said driven plate means, said predetermined torque being selected to avoid torque-related damage from heavy loads.

11. A device as described in claim 10 wherein said tensile-force relief means is connected to said at least one upwardly extending arms.

12. A device as described in claim 9 wherein said deformable, shock, vibration and torque-absorbing means is an annular body of elastomeric material.

13. A device as described in claim 9 wherein said drive plate means includes a tubular portion extending along the axis of said drive shaft means, said tubular portion having an externally threaded pin for attachment to said drive shaft means, and said driven plate means includes a tubular portion extending along the axis of said driven shaft means, said tubular portion having an externally threaded bore for attachment to said driven shaft means.

14. A device for reducing the deleterious torque load on a drive shaft and components of a rotary drilling machine used in mining, the drive shaft moving in a rotational direction and in a longitudinal direction, said device comprising:

drive means connectable to the drive shaft of the rotary drilling machine, said drive means rotating in response to the rotation of the drive shaft for transmitting the rotation of the drive shaft;

driven means connectable to the driven shaft rotated by said drive means, wherein said drive means moves longitudinally away from said driven means in response to the movement of the drive shaft away from the driven shaft in a longitudinal direction;

tensile-force relief means located in the direction of longitudinal movement of said drive means away from said driven means;

a portion fastened to said drive means and fastened to said driven means, said portion including a deformable, torque-absorbing member, said deformable, torque-absorbing member transmitting torque load and force load between said drive means and said driven means;

at least one first engagement means operatively connected to said drive means;

at least one second engagement means connected to said driven means, wherein said first engagement means contacts said second engagement means and said drive means, and relieves the torque on said torque-absorbing member and directly drives said driven means in response to a predetermined amount of torque being applied to said driven means, said predetermined amount of torque being selected to avoid torque-related damage to said deformable, torque absorbing member from heavy loads;

wherein said drive plate means places said deformable, torque absorbing member in tension when the drive shaft moves longitudinally away from said driven means, and wherein said drive means contacts said tensile-force relief means and is restrained by said tensile-force relief means from further movement longitudinally away from said driven means, said predetermined lifting force being selected to avoid further tension being placed on said deformable, torque absorbing member.

* * * * *